(No Model.)
C. R. SWAIN.
PALLET BRICK REPRESSER.
No. 465,978. Patented Dec. 29, 1891.
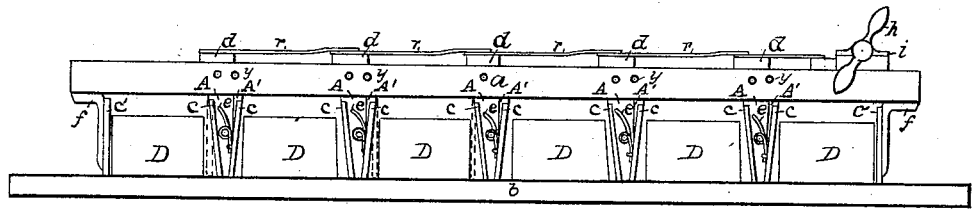
Fig. I
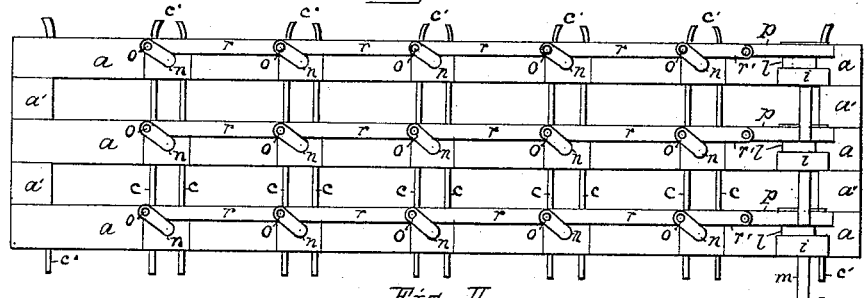
Fig. II
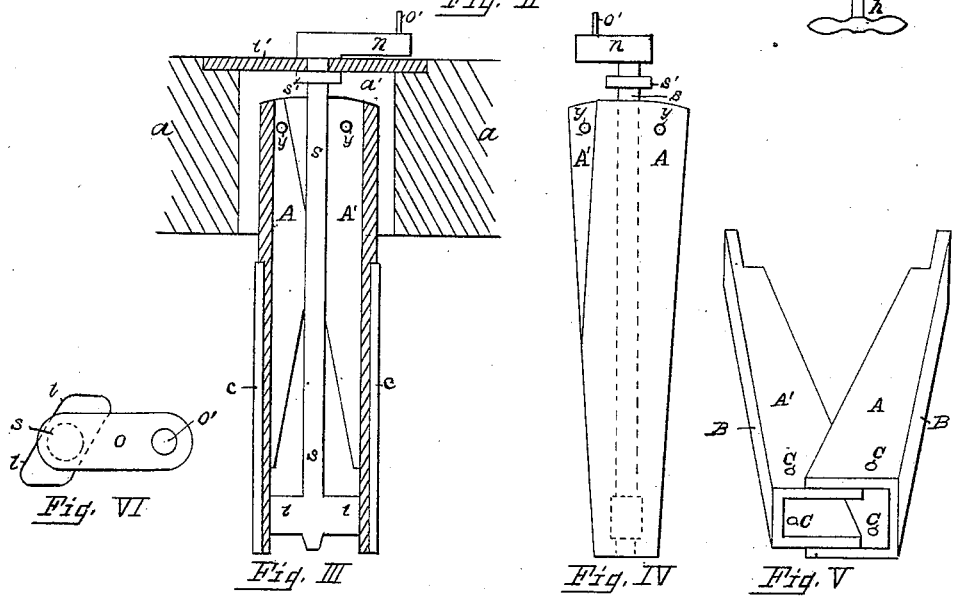
Fig. VI  Fig. III  Fig. IV  Fig. V
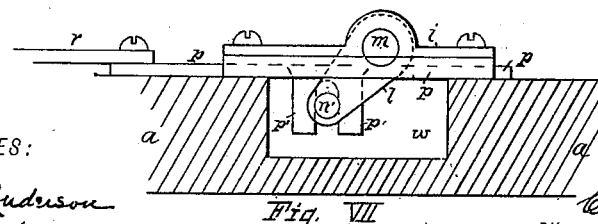
Fig. VII
WITNESSES:
H. Alban Anderson
Wright Horton
INVENTOR
Chas. R. Swain
BY
H. Anderson
ATTORNEY.

UNITED STATES PATENT OFFICE.

CHARLES R. SWAIN, OF PEEKSKILL, NEW YORK.

PALLET-BRICK RE-PRESSER.

SPECIFICATION forming part of Letters Patent No. 465,978, dated December 29, 1891.

Application filed July 11, 1891. Serial No. 399,136. (No model.)

*To all whom it may concern:*

Be it known that I, CHARLES R. SWAIN, a citizen of the United States, residing at Peekskill, in the county of Westchester and State of New York, have invented a new and useful Brick Re-Presser, of which the following is a specification, which I declare to be a full, clear, and exact description of my invention, which will enable others skilled in the art to which it appertains to make and use the same.

My invention relates to the manufacture of pallet bricks, and has for its object the restoration of the symmetry of the bricks when partially dried, as the processes of edging and striking corrects the irregularities of yard bricks. I accomplish this object by the means set forth in the accompanying drawings.

Figure I is a view in elevation of my re-presser. Fig. II is a plan of the same. Fig. III shows details of the pressing devices. Fig. IV shows the combination of movable legs and operating-cams. Fig. V shows how the movable legs are joined. Fig. VI represents the operating-cam, and Fig. VII the cam mechanism on the operating-spindle.

In constructing the re-presser a frame $a\ a\ a\ a$ is made, preferably, of hard wood, consisting in the one illustrated of two side rails and a middle rail joined at the ends by short pieces $a'\ a'\ a'\ a'$. The frame is of a length suited to the form of brick-mold used, and in the illustration is shown to embrace six bricks. From this frame are suspended thin blades in pairs, which are actuated by cams. The mode of suspending these plates is as follows: Metallic legs are made, as A' A, Fig. V, so that one will slip into the other. Through holes $c$ in their upper ends they are hung by pivots $y$ within spaces mortised for them in the framing, as shown in Fig. III. They are thus hung in parallel rows, as shown in Fig. II. When the two pieces are either folded together, as in Fig. IV, or spread apart, as in Fig. III, there is a box-like space between them, which is occupied by a steel spindle $s$, Fig. III, provided at its lower end with cam-like wings $t\ t$. At the upper end of the spindle is a collar $s'$, and the spindle terminates in a crank $n$. The relative positions of the crank and cams on the spindle are shown in Fig. VI. A metallic plate $t'$, Figs. I and II, is inserted between the said collar and crank, and when attached to the framing in the manner shown supports the spindles centrally of the suspended legs and affords a steady bearing for the top end of the spindle. When hung in position, the legs are drawn together by means of springs upon the sides, as shown at $e$, Fig. I. These springs cause the legs to assume a normal position, as shown in Fig. IV, and a quarter-turn of the crank $n$ causes the cams $t\ t$ to spread the legs, as in Fig. III, until the faces of the legs are parallel. These movable legs with the cam-spindles are arranged in groups, as in Fig. II. When so arranged, the outer faces of the legs are provided with steel plates, as $c\ c\ c$, Figs. I and II. The cranks $n$ are then connected in three series, as shown, by bars $r\ r\ r$, and short bars $r'\ r'\ r'$ unite the last cranks to sliding pieces $p\ p\ p$. These slides are arranged as shown in Fig. VII. A spindle $m$ rests across the right end of the frame, supported in bearings $i$. The sliding pieces $p$ lie under the spindle $m$, the spindle forming a top bearing for it. The under side of the slide $p$ is provided with lugs $p'\ p'$, which receive a wrist-pin on the end of crank $l$, said cranks being secured to the spindle $m$. By means of the handle $n$ on said spindle, Fig. I, the slide may be moved to the right and left, causing a like oscillation of all the cranks $n'\ n'\ n'$ and a consequent opening and closing of the legs A' A. The steel plates $c\ c$ are somewhat larger than the edges of the bricks. As will be seen in Fig. I, at each end of the frame $a\ a\ a$, &c., the steel plates $c\ c$ are immovably held by means of brackets $f\ f$. The oscillating plates are arranged at equal and suitable distances between these end plates.

The operation of the device is illustrated in Fig. I. $b$ represents a pallet, on which bricks D have been dumped from the mold. The bricks, being soft, tend to spread at the bottom, as indicated in the third one from the right in the figure, and the result is an inferior brick because of its being wider on one side than the other. When the bricks have dried to a consistency at which the clay may be depended upon to retain its form, this re-presser is placed upon the pallet, as shown by Fig. I. As the pallets lie one above another, with little space between them, it is necessary to insert the represser by pushing the blades in between the bricks from in front. To facilitate doing this the ends of the steel plates are slightly curved at one end, as at $c'$, Fig. II. When the re-presser is in place, a partial turn of the handle $n$ expands the plates $c$ against the sides of the bricks. As a powerful purchase is obtained by means of the cams $t\,t$, the sides of the bricks are pressed to their true form, the operation being indicated in Fig. I by the third brick from the left in the figure, the broken lines showing the position to which the plates $c$ are opened by the cams.

It is plain that a light metallic frame may be substituted for the wooden frame I have represented, and the construction of the various parts may be varied from what I have shown without affecting the principles of my invention, which I have described.

What I claim, and desire to secure by Letters Patent, is—

1. A re-presser for pallet bricks, consisting of a combination of plates in pairs to be inserted between bricks as they lie on a pallet, adapted to be simultaneously separated so as to press the bricks, substantially in the manner described.

2. A pallet-brick re-presser embodying movable plates and stationary end plates $c'\,c'$, substantially as shown.

3. In a pallet-brick re-presser, the combination of the frame $a$, plate $t'$, spindle $s$, with crank $n$ and cam $t\,t$, legs $A'\,A$, pivoted to the frame, and plates $c\,c$, attached to the legs, substantially as shown and described.

4. In a pallet-brick re-presser, the combination of legs $A'\,A$, pivoted to a frame $a$, and springs $e$ to retain them in a normally-closed position, substantially as described.

5. In a pallet-brick re-presser, the combination of the frame $a$, fixed end plates $c'\,c'$, operating-spindle $m$, cranks $l$, slides $p$, engaging with cranks $l$ and connected with the cam-cranks $n$ by means of rods $r\,r$, crank-spindles with cams at lower ends, legs $A'\,A$, pivoted to the frame, springs $e$, and plates $c$, substantially as shown and described.

6. A re-presser for pallet bricks, in which the presser-plates are suspended from a frame in pairs, said frame having fixed plates for the outer edge of the outside bricks, the presser-plate giving pressure to the bricks by means of the separation of the plates between them, substantially as shown and described.

7. In a re-presser for pallet bricks, in combination with fixed plates at the ends of a supporting-frame, presser-plates in pairs to insert between the bricks, the plates being held together normally by springs and adapted to be simultaneously opened by means of cams, all operated from a single point, substantially as shown and described.

CHAS. R. SWAIN.

Witnesses:
FRANK WESSELS,
ARTHUR J. BIRD.